United States Patent
Hama et al.

(10) Patent No.: US 8,746,749 B2
(45) Date of Patent: Jun. 10, 2014

(54) TUBE FITTING FOR RELEASABLY LOCKING AND UNLOCKING A TUBE

(75) Inventors: Tomio Hama, Okaya (JP); Yuji Hamaue, Okaya (JP)

(73) Assignee: Yugen Kaisha Hama International, Nagano (JP)

( * ) Notice: Subject to any disclaimer, the term of this patent is extended or adjusted under 35 U.S.C. 154(b) by 195 days.

(21) Appl. No.: 12/574,192

(22) Filed: Oct. 6, 2009

(65) Prior Publication Data

US 2010/0102548 A1    Apr. 29, 2010

(30) Foreign Application Priority Data

Oct. 23, 2008  (JP) ................................. 2008-273555
May 21, 2009  (JP) ................................. 2009-123527

(51) Int. Cl.
*F16L 37/086*    (2006.01)

(52) U.S. Cl.
USPC ......................................................... 285/307

(58) Field of Classification Search
USPC ................. 285/307–310, 313–315, 322–324, 285/82–88, 305
See application file for complete search history.

(56) References Cited

U.S. PATENT DOCUMENTS

| | | | | | |
|---|---|---|---|---|---|
| 295,408 | A | * | 3/1884 | Kerr ................................. | 279/36 |
| 1,574,922 | A | * | 3/1926 | Nelson ........................ | 294/86.31 |
| 2,231,878 | A | * | 2/1941 | Boynton ........................ | 285/305 |
| 2,961,630 | A | * | 11/1960 | Duncan ......................... | 439/318 |
| 4,696,497 | A | * | 9/1987 | Schwarzensteiner ......... | 285/307 |
| 5,607,190 | A | * | 3/1997 | Exandier et al. ................ | 285/93 |
| 5,775,742 | A | * | 7/1998 | Guest ............................. | 285/323 |
| 5,799,702 | A | * | 9/1998 | Hsien-Jen et al. ............. | 138/120 |
| 6,095,714 | A | * | 8/2000 | Spencer ......................... | 403/377 |
| 6,199,920 | B1 | * | 3/2001 | Neustadtl ....................... | 285/322 |
| 6,435,567 | B2 | * | 8/2002 | Kikumori et al. ............. | 285/319 |
| 6,890,004 | B2 | | 5/2005 | Naito | |
| 6,983,959 | B2 | * | 1/2006 | Wolf et al. ..................... | 285/314 |
| 2002/0047266 | A1 | | 4/2002 | Naito | |
| 2002/0180210 | A1 | * | 12/2002 | Martin-Cocher et al. ..... | 285/308 |
| 2003/0067165 | A1 | * | 4/2003 | Muto ............................. | 285/322 |
| 2003/0201642 | A1 | * | 10/2003 | Guest ............................. | 285/308 |
| 2004/0130144 | A1 | * | 7/2004 | Cronley ........................... | 285/34 |
| 2005/0006896 | A1 | * | 1/2005 | Naito et al. .................... | 285/316 |

FOREIGN PATENT DOCUMENTS

| | | | | |
|---|---|---|---|---|
| EP | 0 021 795 | | 1/1981 | |
| EP | 1533557 | A1 * | 5/2005 | ............. F16L 33/22 |
| JP | 2002-106772 | A | 4/2002 | |
| JP | 2005-172218 | A | 6/2005 | |
| TW | I 245099 | | 12/2005 | |
| TW | I 266842 | | 11/2006 | |

* cited by examiner

*Primary Examiner* — Daniel P Stodola
*Assistant Examiner* — James Linford
(74) *Attorney, Agent, or Firm* — Birch, Stewart, Kolasch & Birch, LLP

(57) ABSTRACT

A tube fitting for attaching and detaching a tube. The tube fitting includes a tubular main body, a sleeve being tubular-shaped and being fixed in the main body with axial lines of the main body and the sleeve coincided with each other. A locking member includes a ring part and a plurality of extended parts extending from the ring part toward an axial direction and being mounted in the sleeve in a state where axial lines of the ring part and the sleeve are coincided with each other and being movable in the sleeve in an axial direction and in a circumferential direction.

20 Claims, 8 Drawing Sheets

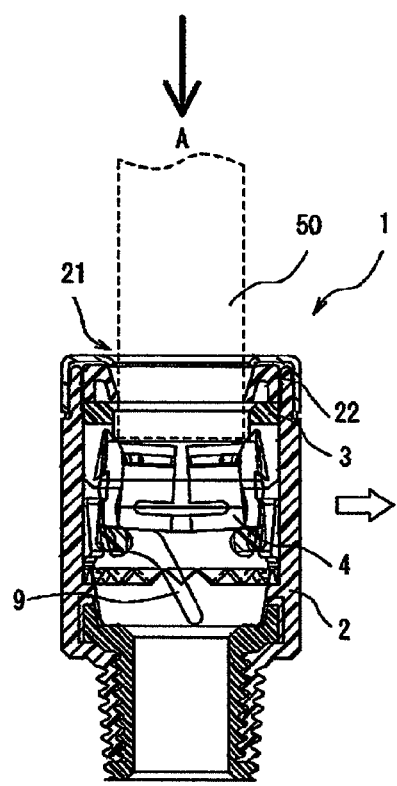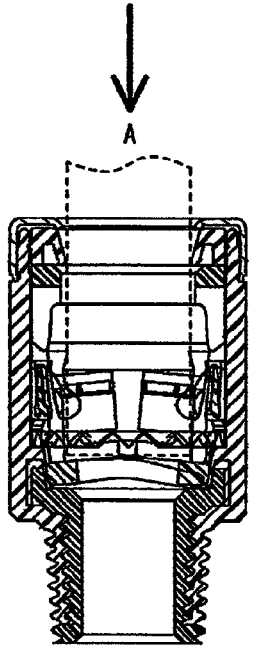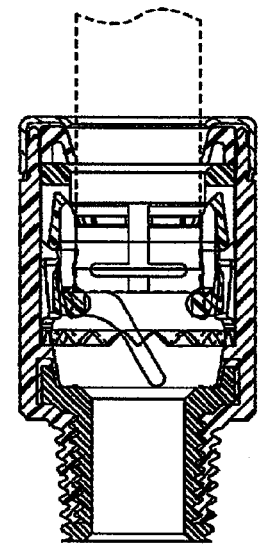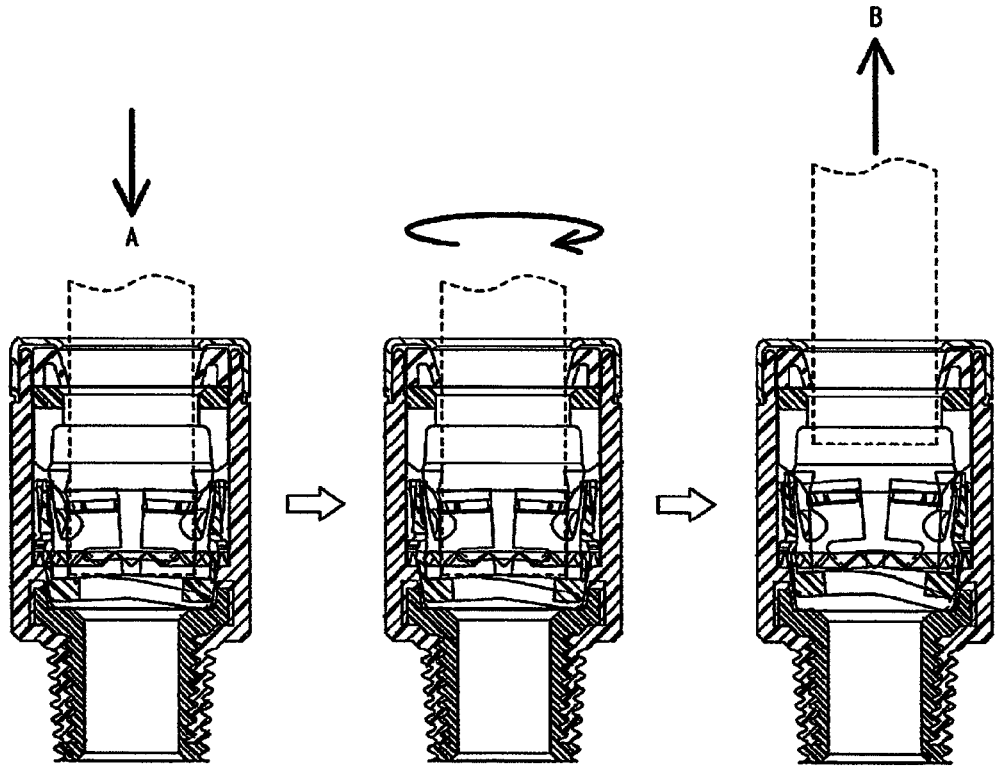
FIG.6A  FIG.6B  FIG.6C
FIG.6D  FIG.6E  FIG.6F

TUBE FITTING FOR RELEASABLY LOCKING AND UNLOCKING A TUBE

BACKGROUND OF THE INVENTION

1. Field of the Invention

The present invention relates to a tube fitting and more particularly to the tube fitting having a main body so formed as to be tubular-shaped and so configured as to lock a tube inserted from an opening part on one end side of the main body and to be able to hold the tube.

2. Description of the Related Art

One example of a conventional tube fitting is disclosed in Patent reference 1 (Japanese Patent Application Laid-open No. 2002-106772). The conventional tube fitting disclosed in the Patent reference 1 has a pipe-shaped main body of a fitting, a guiding tubular body one end of which is inserted into the fitting main body with pressure and is fixed in the fitting main body, a stopper fixed in the guiding tubular body in a state where one end of a guiding case is caulked, an open tubular body held by one end of the guiding tubular body so as to be freely moved in an axial direction, a seal ring, and a locking nail. The tube fitting having the above components is configured to be connected to a connection hole of an external fluid apparatus (see Patent reference 1, FIG. 1, Paragraph no. 0008).

According to the conventional tube fitting, a tube to be connected to an external fluid apparatus is inserted through an inserting entrance of the main body of the fitting (the open case and guiding case make up the inserting entrance). At this point of time, a locking nail is widened outward by an end of the tube and the end of the tube come into contact with an outer circumferential surface of the tube in a state of being struck. In this state, when the tube is pulled and moved toward a pulling and removing direction, the end of the locking nail bites an outer wall of the tube, thereby inhibiting the pulling and removing of the tube. Moreover, in order to pull and remove the tube, the open tubular body is put therein under pressure to release the biting (see Patent reference 1, paragraph 0009).

When a tube is connected to an external fluid apparatus handling a fluid, ordinarily, a plurality of tube fittings to be connected to a connection port of the external fluid apparatus through which the fluid flows in and out, and is placed in a state of being in proximity to one another or being gathered in an intimate manner or positioned in a hard-to-reach place or in a hard-to-see place for an operator of the external fluid apparatus in many cases.

However, the conventional tube fitting as shown in the Patent reference 1 has a problem in that, when a tube is pulled out from the main body of the fitting, it is necessary that the open tubular body is put therein with pressure and the tube is pulled out in a pulling and removing direction and, therefore, manipulation of the fitting and tube with both hands is required, which makes it difficult to perform easy attaching and detaching operations. In particular, as described above, a problem arises in the case where the tube fittings are placed in a state of being in proximity to one another or being gathered in an intimate manner or positioned in a hard-to-reach place or in a hard-to-see place for an operator of the external fluid apparatus, the operation of putting the open tubular body therein with pressure is not easy.

To solve these problems, another tube fitting is disclosed in Patent reference 2 (Japanese Patent Application Laid-open No. 2005-172218) in which a tube can be easily attached and detached only by manipulating the tube with one hand (see FIG. 8). The conventional tube fitting 100 is so configured as to be tubular-shaped and is made up of a fitting main body 102 into which a tube P is inserted from an opening part 106 on one end and a locking member 104 mounted in the fitting main body 102 and locks the tube P inserted into the fitting main body 102 on the fitting main body 102 and holds the tube P, and the locking member 104 includes a ring part 110 whose outer circumferential part is in contact with an inner wall of the filling main body 102 and is configured to be movable toward an axial direction of the fitting main body 102 and an extended part 114 having flexibility which extends from the ring part 110 toward the opening part 106 of the fitting main body 102 and at an end of which a nail part 112 proceeding inward in the fitting main body 102 is formed. The fitting main body 102 has a tapered part 122 whose diameter is gradually decreased on the opening part side 106 and, when the locking member 104 moves toward the opening part 106 side, an end part of the extended part enters to decrease the diameter of the end part and locks a tube P by the nail part 112.

SUMMARY

In view of the above, it is an object of the present invention to provide a tube fitting capable of easily attaching and detaching a tube by one hand manipulation and of more improving attachability and detachability and setting pressure contact force to be higher when compared with the conventional tube fitting.

According to an aspect of the present invention, there is provided a tube fitting including a tubular main body, a sleeve being tubular-shaped and being fixed in the main body with axial lines of the main body and the sleeve being coincided with each other and a locking member having a ring part and a plurality of extended parts extended, from the ring part, in an axial direction, the locking member being provided in the sleeve in a state where axial lines of the ring part and the sleeve are coincided with each other and being movable in the sleeve in an axial direction and in a circumferential direction and wherein each of the extended parts has press nails protruding inward, and a distance between the facing press nails is made smaller than an outer diameter of a tube so as to press the tube inserted into a space therebetween by the facing press nails and wherein at least any one of the locking member and the sleeve has a tapered face for decreasing a diameter of the extended part, and the other thereof has a contact part corresponding to the tapered face for decreasing the diameter of the extended part and wherein, when the tube inserted into a space between the extended parts and fixed and contacted with pressure by the press nails is pulled and moved in a pulling and removing direction without being rotated, the locking member is pulled and moved in the pulling and removing direction and the tapered face for decreasing the diameter of the extended part comes into contact with the contact part corresponding to the tapered face in a state of being struck and slides the contact part in a state of being contacted and the distance between the extended parts is lessened and wherein at least any one of the locking member and the sleeve has a tapered face for lock releasing, and the other thereof has a contact part corresponding to the tapered face for lock releasing and wherein, when the tube inserted into a space between the extended parts and fixed and contacted with pressure by the press nails is rotated and the tube is pulled and moved in a pulling and removing direction in a circumferentially directional position in which the tube is rotated, the locking member is pulled and moved in the pulling and removing direction and the tapered face for lock releasing comes into contact with the contact part corresponding to the tapered face in a state of being struck and slides the contact part in a state of being contacted to extend the distance between the extended parts and contact with pressure by the press nails is released.

With the above configuration, it is made possible to provide a tube fitting capable of easily attach and detach a tube by one hand manipulation. Also, the tube fitting is provided which is capable of setting pressure contact force for holding a tube to be higher.

BRIEF DESCRIPTION OF THE DRAWINGS

The above and other objects, advantages, and features of the present invention will be more apparent from the following description taken in conjunction with the accompanying drawings in which:

FIGS. 6A, 6B, 6C, 6D, 6E, and 6F are diagrams explaining a method of attaching and detaching the tube fitting of FIG. 1;

DESCRIPTION OF EMBODIMENTS

Best modes of carrying out the present invention will be described in further detail using various embodiments with reference to the accompanying drawings.

Figure 1:
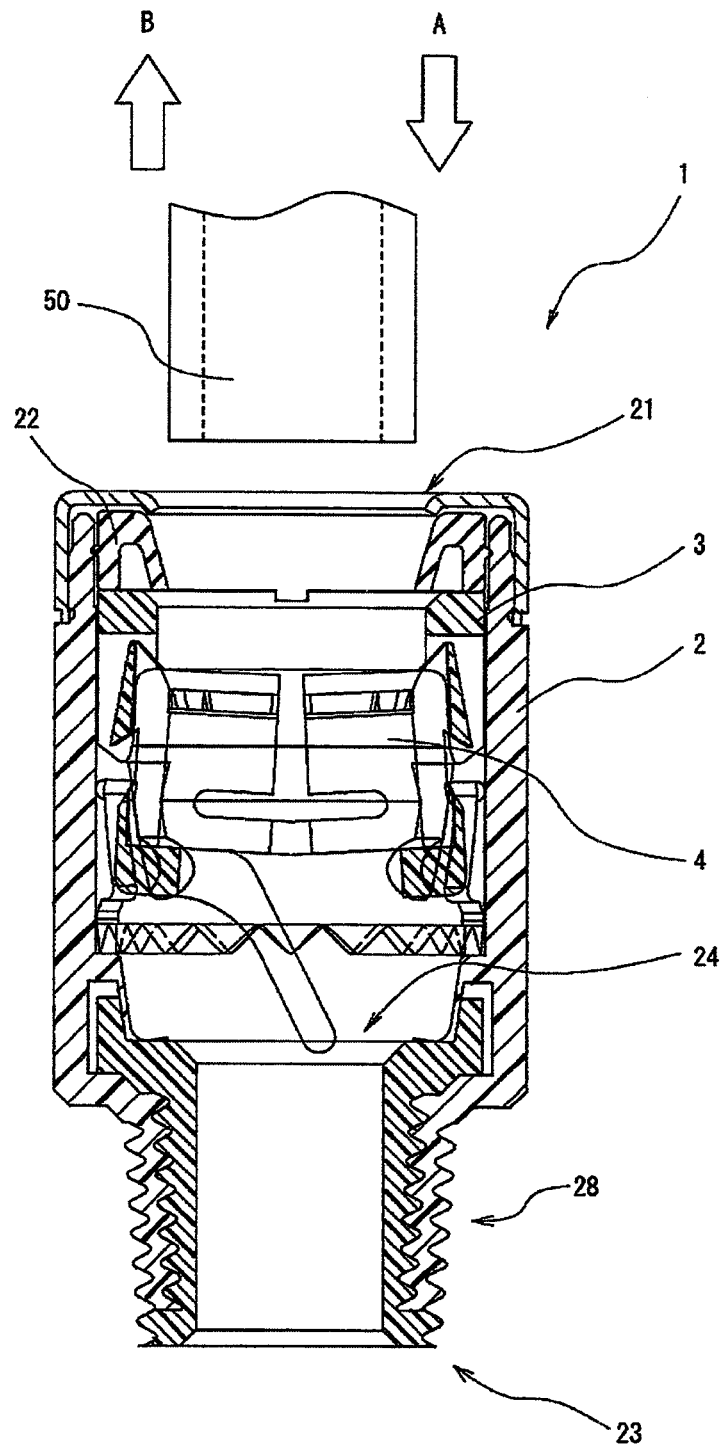
FIG. 1 is a diagrammatical view of a tube fitting of an embodiment of the present invention.
Figure 2A:
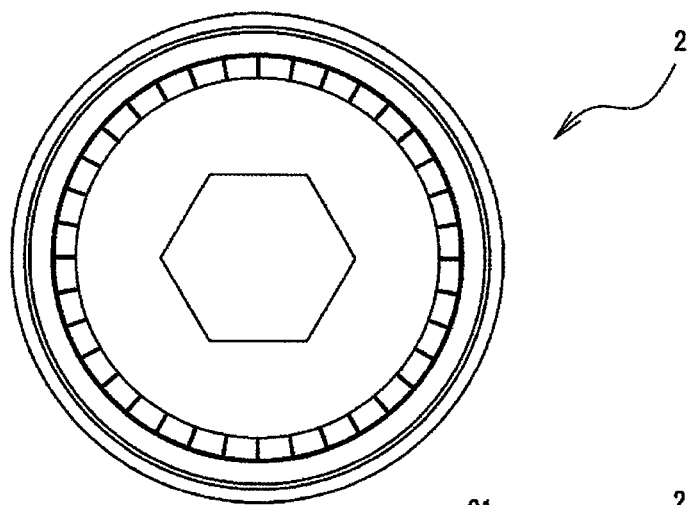
FIGS. 2A and 2B are diagrammatical views of a main body of the tube fitting of the embodiment.
Figure 2B:
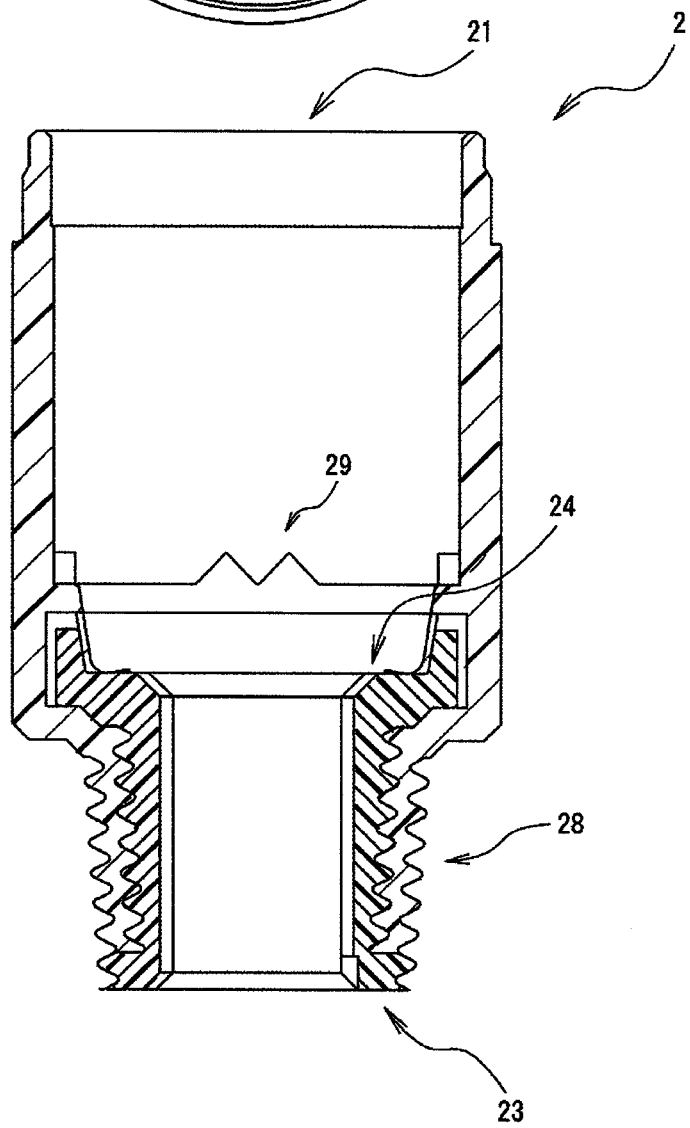
Figure 3A:
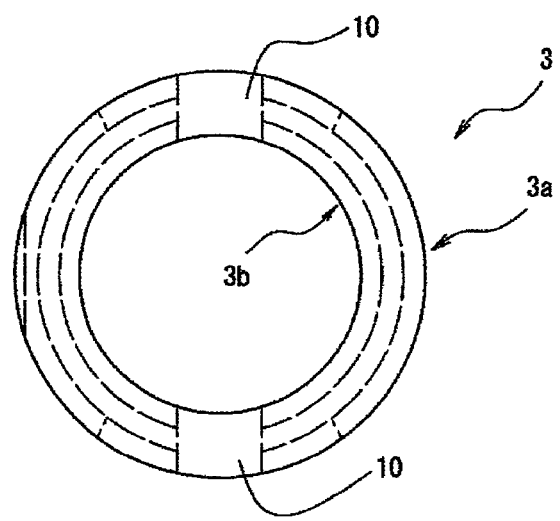
FIGS. 3A, 3B, and 3C are diagrammatical views of a sleeve of the tube fitting of the embodiment.
Figure 3B:
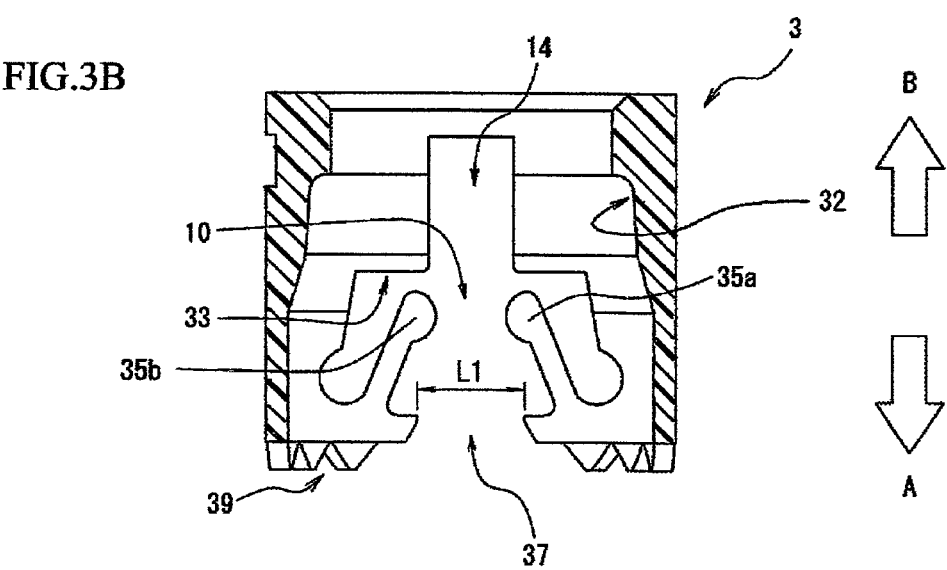
Figure 3C:
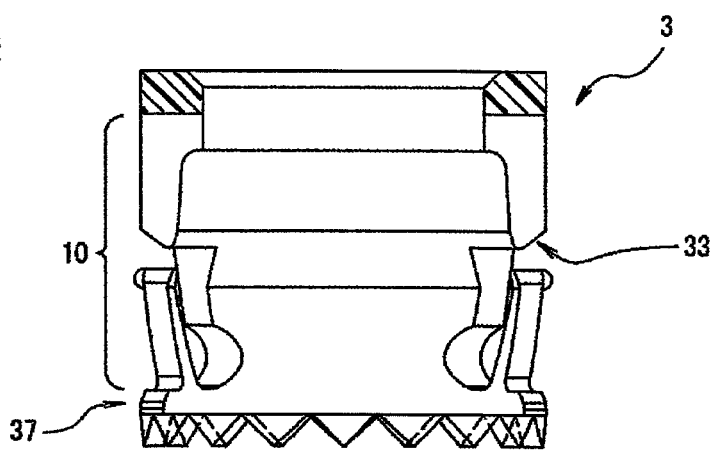
Figure 4A:
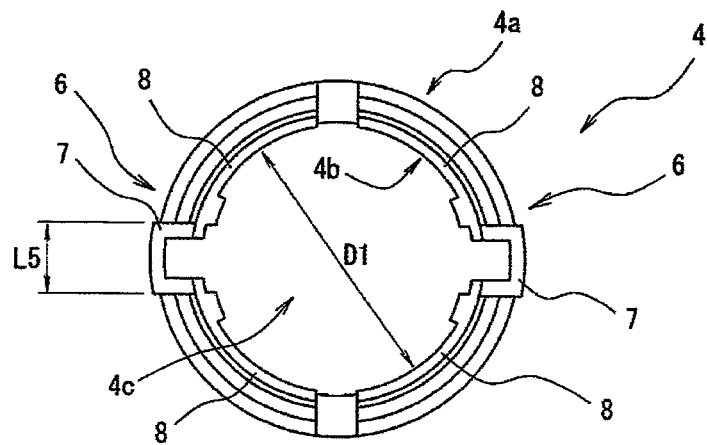
FIGS. 4A, 4B, and 4C are diagrammatical views of a locking member of the tube fitting of the embodiment.
Figure 4B:
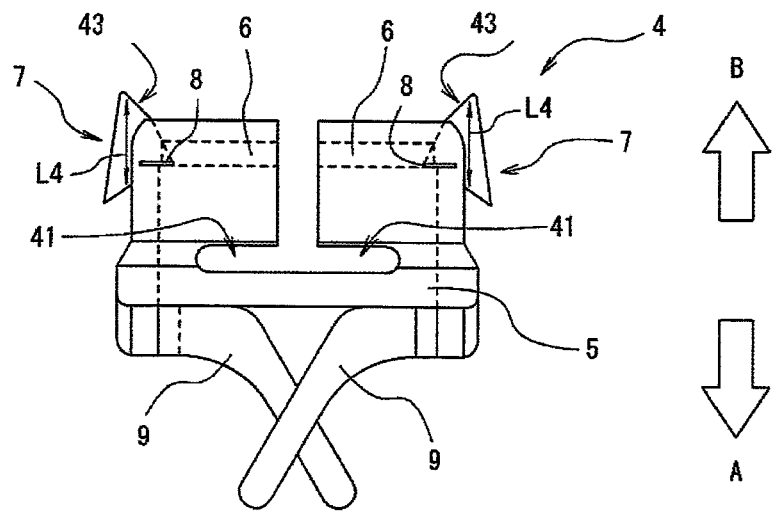
Figure 4C:
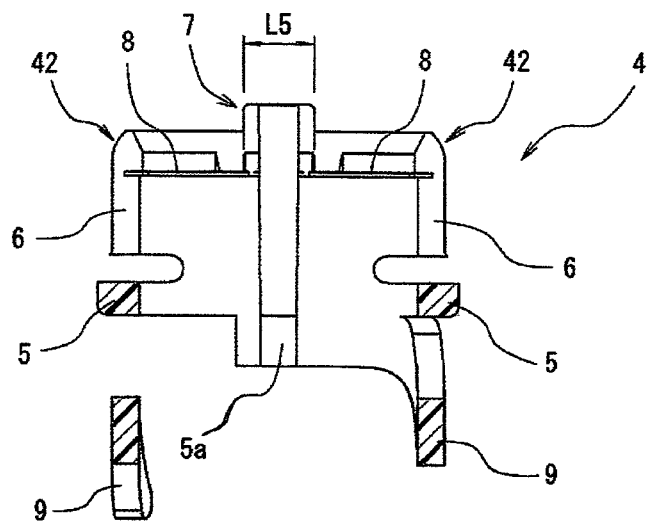

FIG. 1 is a diagrammatical view showing one example of the tube fitting 1 of an embodiment of the present invention. FIGS. 2A and 2B are diagrammatical views of a main body 2 of the tube fitting 1 and FIG. 2A is its plan view and FIG. 2B is its front cross-sectional view. FIGS. 3A, 3B, and 3C are diagrammatical views of a sleeve 3 of the tube fitting 1 and FIG. 3A is its plan view, FIG. 3B is its front cross-sectional view, and 3C is its side cross-sectional view. FIGS. 4A, 4B, and 4C are diagrammatical views of a locking member 4 of the tube fitting 1, FIG. 4A is its plan view, FIG. 4B is its front view, and FIG. 4C is its side cross-sectional view. Moreover, the arrow A shows a tube inserting direction and the arrow B shows a pulling and removing direction of a tube (common in each diagram).

Embodiment

As shown in FIG. 1, the tube fitting 1 of the embodiment of the present invention is formed so as to be tubular-shaped and to have the main body 2 into which a tube 50 is inserted from an opening part 21 on one end part in an axial direction. The other end part 23 of the main body 2 is connected, by a connection screw 28, to a connection hole (not shown) of an external fluid apparatus (not shown) from or to which a fluid flows.

Into the main body 2 is internally fitted the sleeve 3 having a tubular shape (see FIGS. 3A, 3B, and 3C) so that the axial direction of the sleeve 3 coincides with the axial direction of the main body 2 and so that the sleeve 3 is fixed in the main body 2. Also, into the sleeve 3 is internally fitted a locking member 4 (see FIGS. 4A, 4B, and 4C) made up of a ring part 5 having a ring shape and a plurality of extended parts 6 each coming out in a state of being extended from the ring part 5 in an axial direction. The locking member 4 is configured so that an axial direction of the ring part 5 coincides with an axial direction of the sleeve 3 and so as to be movable in the sleeve 3 in the axial direction and to be rotatable inversely and non-inversely in a circumferential direction. Moreover, the reference No. 22 in FIG. 1 shows a rubber packing mounted in the opening part 21 which seals against leakage of a fluid to be passed by coming into intimate contact with the main body 2 and the tube 50 to be inserted.

FIGS. 2A and 2B show configurations of the main body 2. (FIG. 2A is its plan view and FIG. 2B is its front cross-sectional view). The main body 2 is configured by using PBT (polybutylene terephthalate) being excellent in thermal stability, dimensional accuracy, and electrical properties. Moreover, the reference No. 29 in FIG. 2B shows a whirl-stop to prevent the sleeve 3 internally fitted into the main body from inverse and non-inverse rotation in a circumferential direction, which is fitted into a whirl-stop 39 mounted in the sleeve 3.

FIGS. 3A, 3B, and 3C show configurations of the sleeve 3. (FIG. 3A is its plan view, FIG. 3B is its front cross-sectional view, and FIG. 3C is its side cross-sectional view). In the sleeve 3 is formed a notch hole 10 which passes through a cylindrical wall part, that is, passes between an outer circumferential part 3a and inner circumferential part 3b. In the embodiment of the present invention, the notch hole 10 is formed at two places in a manner to be symmetrical with respect to an axis. The protruded part 7 (described later) making up the locking member 4 is engaged in the notch hole 10 in a state of being associated with one another. Moreover, the reference No. 39 shows the whirl-stop to prevent the sleeve 3 from inverse and non-inverse rotation of the sleeve 3 in the main body 2 in a circumferential direction. The sleeve 3 is configured by using, for example, a resin material such as POM (polyacetal) resin.

Figure 5:
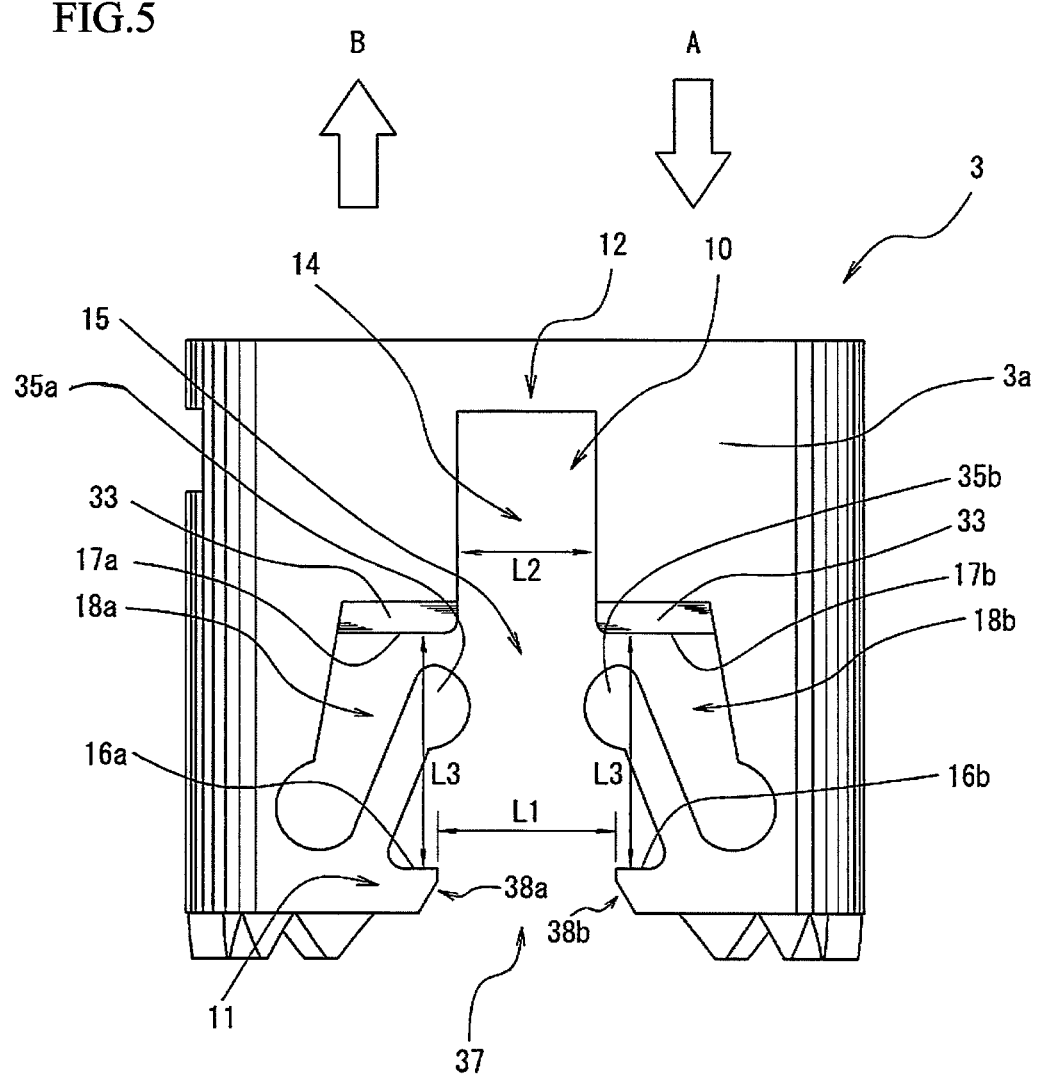
FIG. 5 is an enlarged view showing configurations of a notch hole of the sleeve of the tube fitting of the embodiment.

FIG. 5 is an enlarged view of the notch hole 10. In a rear end part 12 (end part on the opening part 21 side of the main body 2) in an axial direction of the notch hole 10 is formed an escape groove 14 having a width L2 in a circumferential direction into which the protruded parts 7 of the locking member 4 are allowed to come in an axial direction. The protruded parts 7 having already entered the escape groove 14 are held so as not to rotate inversely or non-inversely in a circumferential direction. Further, in the notch hole 10 are formed circumferentially directional grooves 18a and 18b. The width L3 of each of the groove parts 18a and 18b in an axial direction is defined by sides 16a and 16b of a front end part 11 (end part being opposite to the opening part 21 side of the main body 2) in an axial direction of the notch hole 10 and by sides 17a and 17b extending in a circumferential direction from both corners of an entrance part 15 (end part being opposite to the opening part 21 side of the main body 2). Here, the notch hole 10 is so formed that the width L3 of each of the circumferentially directional grooves 18a and 18b>the width L4 of each of the protruded parts 7 (see FIG. 4B).

The characteristic configuration of the embodiment of the present invention is that the sleeve 3 has guiding part 35 to guide the protruded parts 7 to the escape groove 14 when the protruded part 7 (described later) of the locking member 4 moves toward the pulling and removing direction of a tube. More specially, the guiding part 35 is formed by two bar-like parts (35a and 35b) each extending from the front end part 11 in an axial direction of the notch hole 10 (end part being opposite to the opening part 21 side of the main body 2) toward both the corners of an entrance part 15 (end part being opposite to the opening part 21 side of the main body 2) of the escape groove 14. In the embodiment of the present invention, the notch hole 10 is formed at two places and, therefore, the guiding parts 35 are formed in a manner to be symmetrical with respect to an axis. Moreover, in the embodiment of the present invention, the guiding parts 35a and 35b are arranged so that intervals in a circumferential direction gradually become narrow relative to the pulling and removing direction of a tube, however, may be arranged in a manner to be approximately parallel to one another. Moreover, the guiding parts 35a and 35b may be not only of a bar-like shape but also of a plate-like shape.

By configuring as above, at time of assembly of the tube fitting 1 or at time of use of the tube fitting 1, when the protruded part 7 (to be described later) moves to the pulling and removing direction of a tube, the protruded parts 7 are guided by the guiding parts 35a and 35b and are prevented from being caught by both the corners in the entrance part 15 (end part being opposite to the opening part 21 side of the main body 2) of the escape groove 14, thus achieving the effect of sure guidance the protruded part 7 to the escape groove 14.

The sleeve 3 of the embodiment of the present invention, as shown in FIG. 5, includes a slit part 37 formed at a position being opposite to the escape groove 14 in an axial direction in the front end part 11 of the notch hole 10, which has a circumferentially directional width L1 enabling the protruded part 7 of the locking member 4 to come in the inner part of the notch hole 10 from the outside of the sleeve 3 in an axial direction.

In the slit part 37 of the notch hole 10, its front end part 11 (end part being opposite to the opening part 21 side of the main body 2) in an axial direction is opened with a circumferentially directional width L1 (most narrowest part in a circumferential direction defined by the sides 38a and 38b) toward a direction being opposite to the opening part 21 side of the main body 2. Here, the slit part 37 is so formed that the width L1 of the circumferentially directional width>the circumferential width L5 of the protruded part 7 of the locking member 4 (see FIG. 4C).

In the above configurations, the sleeve 3 has the slit part 37 and, therefore, it is possible to get the protruded part 7 of the locking member 4 easily enter the notch hole 10 of the sleeve 3. Further, the escape groove 14 is formed at a place being opposite to the slit part 37 in an axial direction and the guiding parts 35a and 35b are also formed and, therefore, it is possible to get the protruded part 7 of the locking member 4 having entered the notch holes 10 easily and surely enter the escape groove 14 of the sleeve 3. As a result, assembling operations of incorporating the locking member 4 into the sleeve 3 become very easy, which is very effective in automating a production line.

FIGS. 4A, 4B, and 4C show configurations of the locking member 4. (FIG. 4A is its plan view, FIG. 4B is its front view, and FIG. 4C is its side cross-sectional view). In the embodiment of the present invention, the extended parts 6 are mounted at two places in a manner to be symmetrical with respect to the axis of the ring part 5. It is not necessary that the extended parts 6 are mounted at two places, however, in the case of mounting the extended parts 6 at two places, a metal-molded parting line is divided into two parts and, therefore, productivity is improved.

In the embodiment of the present invention, each of the extended parts 6 has a semi-cylindrical shape obtained by dividing a circular part into two parts (by slitting) and the notch part 41 extending toward the circumferential direction is formed at a connection part to the ring part 5, which enables both the extended parts 6 to be bent with an elastic force toward both the outside parts. In the inner circumferential part 4b of each of the extended parts 6 is formed press nails 8 in a state of being stood inward toward a diameter direction. Here, the distance D1 between the press nails 8 facing each other centering on an axis is smaller than an outer diameter of a tube 50 so that the press nails 8 are put into contact to the tube 50 with pressure. For example, by forming the press nails 8 so as to have a saw-blade shape, it is made possible to enhance biting force and frictional force.

Moreover, in the extended part 6 making up the locking member 4 is formed the protruded part 7 in a state of being stood outward in the diameter direction. The protruded part 7 enters the notch hole 10 arranged at a corresponding position and can move in the notch hole 10. Thus, the protruded parts 7 are placed in an associated in a manner to be moved in the notch hole 10 and, therefore, it is made possible to hold the locking member 4 in the sleeve 3 in a movable manner and to limit the movable region to a specific region. Moreover, each tapered face formed in each of the sleeve 3 and locking member 4 can come into contact with a corresponding contact part in a state of being struck and then can slide in a state of being contacted (described in detail later).

The locking member 4 is made of, for example, a resin material having flexibility and the press nail 8 is made of, for example, stainless steel. Moreover, as the resin material, POM (Polyacetal) is suitably used which is excellent in strength, elastic constant, shock resistance property, and sliding characteristics.

Here, the tube fitting 1 is provided with a momentum-giving member 9 (referred to as a first momentum-giving member) to give momentum to the looking member 4 in the pulling and removing direction (arrow B) of a tube. In the embodiment of the present invention, the momentum-giving member 9 is formed integrally with the locking member 4. More specifically, the momentum-giving member 9 is so formed as to extend helically from the ring part 5 toward an insertion direction (arrow A) of a tube and is mounted at two places in a manner to be symmetrical with respect to the axis (see FIGS. 4B and 4C). By configuring as above, when tubes are pushed and moved without a bottleneck in the insertion of tubes, the momentum-giving force can be generated. The above integral formation enables reduction of manufacturing costs. Moreover, the momentum-giving member 9 may be formed separately from the locking member 4 and the shape other than described above such as a coil-shape may be employed as well.

Further, each of the momentum-giving member 9 is formed so as to be extended in a manner to correspond to each of the extended parts 6. Thus, when the tube 50 is inserted into the locking member 4, the locking member 4 is pushed and moved in an insertion direction and, as a result, a front end part of the momentum-giving member 9 comes into contact with the corresponding contact part 24 of the main body 2 in a state of being struck and then slides in a state of being contacted and the ring part 5 is bent in a A-shaped manner (viewed horizontally), which causes the distance between the facing extended parts 6 to be extended (see FIGS. 6A and 6B). As a result, the distance between the facing extended parts 6 is extended, particularly the distance between the facing press nails 8 being smaller than an outer diameter of the tube 50 is increased so as to be larger than the outer diameter of the tube 50 and, therefore, the tube 50 is allowed to enter a space part 4c between the facing extended parts 6 (between the facing press nails 8 in particular) (see FIG. 6B). Moreover, strictly, the tube 50 comes in the space part 4c while coming in contact with the press nails 8 in a state of being slid.

The tube fitting 1 of the embodiment of the present invention has a momentum-giving member 36 (hereafter, referred to as a second momentum-giving member) which is configured to position the locking member 4 at a specific place in a circumferential direction and to generate a momentum-giving force to return the locking member 4 back to its original specific place when the locking member 4 rotates in the circumferential direction.

According to the embodiment of the present invention, the guiding parts 35a and 35b serve also as the second momentum-giving member 36, thereby achieving the simplification of the tube fitting, reduction of component counts and decrease in manufacturing costs.

In the configuration using the momentum-giving member 36, at the time of operating the tube fitting 1, even when inverse and non-inverse rotational force does not act on the tube 50 fixed to the locking member 4 or even when the inverse and non-inverse rotational force on the tube 50 is slight due to twist of the tube 50, the protruded part 7 of the locking member 4 is prevented from coming into the circumferentially directional grooves 18a and 18b in a circumferential direction and, therefore, no shift to locking release operations occurs, which prevents locking of the tube 50 from being released against an operator's will. Furthermore, by configuring the tube fitting 1 using the momentum-giving member 36, the momentum-giving force can be generated to return the locking member 4 back to its original specific position even when the locking member 4 rotates in the circumferential direction. More specifically, when the locking member 4 rotates in the circumferential direction, the momentum-giving member 36 is bent and deformed by being moved by being pushed in the circumferential direction (see FIG. 7C). The force to restore the bent deformation becomes the momentum-giving force which returns the rotated locking member 4 back to its original specific position, that is, to the place where the positions of the protruded section 7 and escape groove 14 coincide with each other. Moreover, the momentum-giving member 36 may be made of a resin material having flexibility (polyacetal or a like) and may be formed integrally with the sleeve 3 or formed separately.

Then, each tapered face (action face formed to have a tapered shape) being a characteristic configuration of the tithe fitting of the embodiment of the present invention is described.

First, the sleeve 3 has a tapered face 32 for decreasing a diameter of the extended part and the locking member 4 has a tapered face 42 for decreasing the diameter of the extended part which serves as a contact part corresponding to the tapered face 32 (see FIGS. 3B, 3C, 4B, and 4C). More specifically, the tapered face 32 for decreasing the diameter of the extended part is formed on an inner circumferential part 3b of the sleeve 3 and its acting surface is configured to face a side opposite to the opening part 21 and has a shape to decrease the distance between the tapered faces 32 in a pulling and removing direction of the tube 50. Moreover, the tapered face 42 for increasing a diameter of the extended part is formed on an outer circumferential part 4a of the locking member 4 (here, the extended part 6) and its acting surface is configured to face the opening part 21 side and has a shape to increase the distance between the tapered faces 42 in an inserting direction of the tube 50.

By configuring as above, when the tube 50 inserted and locked in the locking member 4 is pulled and moved, without being rotated in a circumferential direction in the pulling and removing direction (the case where the tube 50 is rotated is described later), the locking member 4 is also pulled and moved together with the tube 50 toward the pulling and removing direction and, as a result, the tapered face 32 for decreasing the diameter of the extended part 6 comes in contact with the contact part corresponding to the tapered face 32, that is, the tapered face 42 for decreasing the diameter of the extended part 6 in a manner being struck and then slides in a state of being contacted. At this time point, by an action of force (force being pushed inward in a diameter direction) which the tapered face 42 receives from the tapered face 32, an end part on the opening part 21 side of the extended part 6 in which the tapered face 42 is formed changes its position inward in a diameter direction. As a result, the distance between the facing extended parts 6, in particular, the distance between facing press nails 8, which is formed so as to be smaller than an outer diameter of the tube 50, is lessened and each of the press nails 8 further more bites the outer circumferential part of the tube 50. That is, the larger the force of pulling and moving the tithe 50 in the pulling and removing direction becomes, the smaller the distance between the press nails 8 becomes, which causes the force occurring when the press nails 8 bite the tube 50, that is, pressure contact force between the tube 50 and press nails 8 to be made larger and the pulling and moving force to be larger, thereby preventing the tube 50 from being pulled and removed even in the case where the pulling and moving force becomes large. FIG. 6C shows the state in which the tube 50 is locked.

In the embodiment of the present invention, both the faces 32 and 42 for decreasing the diameter of the extended part are taper-shaped, however, alternatively, one of the two faces may be taper-shaped and the other face serving as the corresponding contact part may have a shape other than a tapered shape. So long as one of the faces can be used for coming into contact with the other face in a state of being struck and then sliding the other face in a state of being contacted, it is not necessary that both the two faces are taper-shaped and the same effects can be obtained.

The sleeve 3 has a tapered face 33 for lock releasing and the locking member 4 has a tapered face 43 for lock releasing which serves as a contact part corresponding to the tapered face 33 (see FIGS. 3B and 3C and FIG. 5). More specifically, the tapered faces 33 for lock releasing make up sides 17a and 17b of the circumferentially directional grooves 18a and 18b of the notch hole 10 and its acting surface is configured to face a side opposite to the opening part 21 and has a shape to increase the distance between the tapered faces 33 in a pulling and removing direction of the tube 50. Moreover, the tapered faces 43 for lock releasing are formed in an end part on the opening part 21 side of the protruded part 7 and its acting surface is configured to face the opening part 21 side and has a shape to decrease the distance between the tapered faces 43 in an inserting direction of the tube 50.

By configuring as above, when the tube 50 inserted and locked in the locking member 4 is rotated in a circumferential direction and is pulled and moved at a circumferential position where the tube 50 is rotated in a pulling and removing direction (the case where the tube 50 is not rotated is described above), the locking member 4 is also pulled and moved together with the tube 50 toward the pulling and removing direction and, as a result, the tapered face 33 for lock releasing comes in contact with the contact part corresponding to the tapered face 43, that is, the tapered face 43 for lock releasing in a manner being struck and then slides the contact part in a manner being contacted. At this time point, by an action of force (force being attracted outward in a diameter direction) which the tapered face 43 receives from the tapered face 33, an end part on the opening part 21 side of the extended part 6 in which the tapered face 43 is formed changes its position outward in a diameter direction. As a result, the distance between the facing extended parts 6, in particular, the distance between facing press nails 8, which is formed so as to be smaller than an outer diameter of the tube 50, is extended and, therefore, pressure contact force of the tube 50 by press nails 8 is released, thus enabling the tube to be pulled and removed (see FIG. 6F). More precisely, when a state in which the pressure contact force is less than frictional force between the press nail 8 and outer circumference of the tube 50 occurs, the tube 50 is pulled and removed while being in contact with the press nail 8 in a state of being slid.

Further, in the embodiment of the present invention, both the faces 33 and 43 for lock releasing are taper-shaped, however, alternatively, one of the two faces 33 and 43 may be taper-shaped and the other face serving as the corresponding contact part may have a shape other than a tapered shape. So long as one of the faces 33 and 43 can be used for coming into contact with the other face in a state of being struck and sliding the other face in a state of being contacted, it is not necessary that both the two faces 33 and 43 are taper-shaped to obtain the same effects.

Next, the locking member 4 has a tapered face 48 for increasing a diameter of the extended part (FIGS. 4A, 4B, and 4C). More specifically, the tapered face 48 is positioned in a diameter direction so as to come into contact with a front end part of the tube 50 to be inserted at an end part on the opening part 21 side of the protruded part 7 and its acting surface has a shape that faces the opening part 21 side and decreases the distance toward an inserting direction of the tube 50. Moreover, in the embodiment of the present invention, for simplification of the structure, the tapered face 43 for lock releasing also serves as the tapered face 48 for increasing the diameter of the extended part.

By configuring as above, when the tube 50 is inserted, the front end part of the tube 50 comes into contact with the tapered face 48 in a state of being struck and slides the tapered face 48 in a state of being contacted. At this time point, by an action of force (force being pushed inward in a diameter direction) which the tapered face 48 receives from the front end of the tube 50, an end part on the opening part 21 side of the extended part 6 in which the tapered face 48 is formed changes its position outward in a diameter direction. (Moreover, when the contact of the front end part of the tube 50 with the tapered face 48 in a state of being struck and sliding of the end part with the tapered face 48 in a state of being contacted is terminated, the shift to the contact between the intermediate circumference of the tube 50 and the tapered face 48 in a state of being struck and slid.) As a result, the distance between the facing extended parts 6, particularly, the distance between the facing press nails 8, which is smaller than an outer diameter of the tube 50, is extended so as to be larger than the outer diameter of the tube 50, which enables the tube 50 to enter the space part 4c between the facing extended parts 6 (between the facing press nails 8) (see FIG. 6B). More precisely, the tube 50 enters the press nails 8 while being in contact with the press nails 8 in a state of being slid.

Additionally, all or part of each configuration described above employed to increase the diameter of the extended part, when the tube 50 is inserted therein, may be applied.

Here, if the tapered face 33 for lock releasing is to be formed not in the sleeve 3 but in the main body 2, manufacturing and working of the main body 2 or fabrication of a metal mold becomes impossible or very complicated and extremely difficult. This is also true in the case where the connection screw 28 is to be integrally formed at an end of the main body 2 as in the case of the embodiment (see FIG. 1).

However, in the embodiment of the present invention, forming of the sleeve 3 enables the formation of the complicated shape of the notch hole 10 and the formation of the tapered face 33, thus achieving easy and highly-accurate formation of these components. That is, by configuring as above, the great effects can be obtained in achieving manufacture, workability, large-volume production possibility, and reduction in manufacturing costs of the tube fitting 1.

Then, by referring to FIGS. 6A, 6B, 6C, 6D, 6E, and 6F, one example of procedures for attaching the tube 50 to the tube fitting 1 and operations of the tube fitting 1 is described.

Figure 7A:
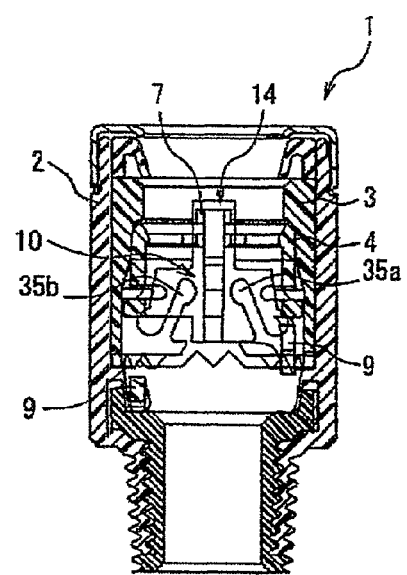
FIGS. 7A, 7B, and 7C are also diagrams explaining a method of attaching and detaching the tube fitting of FIG. 1.

First, at the stage before the attachment (insertion) of the tube 50 to the tube fitting 1, the tube fitting 1, as shown in FIG. 1, stands still in a state in which the momentum is given to the locking member 4 by the momentum force of the momentum-giving member 9 toward the opening part 21 side. FIG. 7A shows a cross-sectional view of the tube fitting 1 (the tube 50 is not shown therein) obtained when FIG. 1 is seen at an angle different by 90 degrees.

In the state shown in FIG. 1, an operator inserts the tube 50 from the opening part 21 (see FIG. 6A). At this point of time, the front end part of the tube 50 comes into contact with the tapered face 48 in a state of being struck and slides the tapered face 48 in a state of being contacted, or the front end part of the tube 50 comes into contact with an upper surface on the opening part 21 side of the press nails 8 formed in the extended parts 6 and, as a result, the locking member 4 internally fitted in the sleeve 3 is pulled by the tube 50 to move toward an inserting direction. This causes a front end part of the momentum-giving member 9 mounted in the lower part of the locking member 4 to slide the contact part 24 of the main body 2 in a state of being contacted to generate momentum-giving force. Then, by pushing further the tube 50 against the momentum-giving force, the front end part of the momentum-giving member 9 comes into contact with the contact part 24 in a state of being slid to bend the ring part 5, thus extending the distance between the facing extended parts 6 (between press nails 8). Therefore, the tube 50 is allowed to enter the space part 4c (FIG. 6B). Moreover, since the stoppers 5a and 5b to regulate an amount of entrance of the tube 50 is formed in the ring part 5 of the locking member 4, the tube 50 does not enter to a degree of exceeding the amount of the entrance of the tube 50 into the locking member 4. During the above operations, the part with which the front end part of the tube 50 comes into contact, as the diameter between the extended parts 6 (between the press nails 8) increases and moves toward the stoppers 5a and 5b from the tapered face 48 or from the upper surface on the opening part 21 side of the press nails 8. In addition, FIG. 6A shows the state in which the front end part of the tube 50 comes into contact with the tapered face 48 in a state of being struck.

Figure 7B:
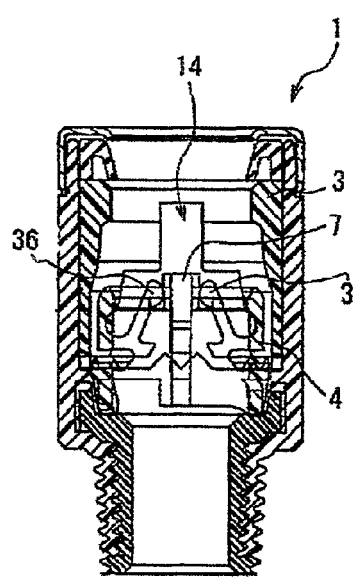

FIG. 7B is a cross-sectional view obtained when FIG. 6B is seen at an angle different by 90 degrees (the tube 50 is not shown therein).

In the tube fitting 100 described in the Patent reference 2 in the prior application, the tube inserting method is employed in which the tapered face formed in an end of an extended part is pushed to extend the end of a tube so that the tube is inserted into the tube fitting 100. However, in the method of the embodiment of the present invention, the tube 50 is inserted using the locking member 4 to cause the pushing move force of the tube 50 to act on the momentum-giving member 9 so that the distance is expanded between the extended parts 6 facing each other and the conventional method is also employed partially in an auxiliary and shared manner (that is, in the action by the tapered face 48). Ordinarily, pressure contact force between the extended parts 6 and the tube 50 is determined by the strength of the extended parts 6. In the conventional tube fitting 100 of the prior application, this strength is determined according to the strength of the tube fitting 100 in a diameter direction. However, in the tube fitting 1 of the embodiment of the present invention, this strength is determined according to the strength of the tube 50 in an axial direction. In general, diameter-directional strength of a tubular member is generated by compression of a hollow part and is relatively weak. Conversely, a tubular axial directional strength is generated by compression of a solid part and is relatively strong. According to the embodiment of the present invention, an outer circumferential part is covered by the locking member 4 which suppresses outward buckling movement, thus further increasing the strength of the tube fitting 1. As a result, it is possible to more enhance the pressure contact force applied in the present invention compared with the case of the conventional tube fitting 100 of the prior application. By configuring as above, reliable connection of the tube 50 to the tube fitting 1 is made possible, which can be suitably used in a high pressure fluid tube.

When an operator stops the insertion of the tube 50 into the tube fitting 1, the tube fitting 1 is automatically locked. More specifically, this is because of the occurrence of restoring force which occurs when the extended parts 6 whose diameter is forcedly extended tries to return itself to its original state. At this point of time, pushing movement force toward the momentum-giving member 9 disappears and restoring force additionally occurs when the ring part 5 tries to return its bent state to its original state.

At the time of the insertion of the tube 50, when insertion force of the tube 50 is released, the momentum-giving member 9 (hereinafter referred to as a first momentum-giving member) moves, by being pushed, the locking member 4 in a pulling and removing direction and, therefore, the protruded part 7 moves by being guided by the guiding part 35 (momentum-giving member 36) toward the pulling and removing direction, thus causing the protruded part 7 to stop in a state where the protruded part 7 has entered the escape groove 14. In this state, inverse and non-inverse rotation of the protruded part 7 in a circumferential direction is made impossible and the entrance of the protruded part 7 into the circumferentially directional grooves 18a and 18b becomes also impossible and, therefore, no shift to operations of lock releasing occurs, which prevents the unwished releasing of the tube locking (see FIG. 6C). In a state where no axial directional external force and no circumferential directional external force act on the tube 50 inserted in the space between the extended parts 6 and pressed by the facing press nails 8, the axial directional position of the protruded parts 7 is positioned in the escape groove 14 by the first momentum-giving member 9 or the first and second momentum-giving members 36.

Here, in the conventional tube fitting 100 disclosed in the Patent reference 2 of the prior application, the tube P is locked by the method in which, after the insertion of the tube P, the tube P is pulled in a reverse direction (in the pulling and removing direction) (see Paragraph No. 0040 in the Patent reference 2). In the tube fitting 1 of the embodiment of the present invention, automatic locking of the tube 50 is made possible only by the stop of insertion of the tube 50, thus achieving the more easy method for attaching the tube 50 to the tube fitting 1. Moreover, as described above, the locking of the tube 50 is completed mainly by the restoring force of the extended parts 6 whose diameter has been extended and the locking member 4 is moved by the momentum-giving member 9 in the pulling and removing direction which causes the tapered faces 32 and 42 to come into intimate contact with each other, thus achieving more reliable locking.

In this locked state (FIG. 6C), even if the tube 50 is pulled in the pulling and removing direction, as described above, the locking is not released. In the embodiment of the present invention, by configuring the tube fitting 1 so as to have the sleeve 3 and locking member 4 to cause pulling and removing force generated by the tube 50 to act on the tapered faces 32 and 42 and to lessen the distance between the facing extended parts 6, the stronger the pulling and removing force becomes, the more the distance between the facing extended parts 6 is lessened, thus causing the press nails 8 to strongly bite the tube 50 to ensure the locking of the tube 50.

Incidentally, in the state where the tube 50 is locked, the inner circumferential part of the packing 22 and outer circumferential part of the tube 50 come into intimate contact with each other without a clearance and the outer circumferential part of the packing 22 and inner circumferential part of the main body 2 come into intimate contact with each other without a clearance and, therefore, the leakage of flowing liquid to the outside can be prevented.

Next, procedures for removing the tube 50 from the tube fitting 1 and one example of operations of the tube fitting 1 are described. When the tube 50 in the state of being locked, as shown in FIG. 6C, is to be removed, an operator first pushes the tube 50 in an inserting direction (FIG. 6D). Then, the operator pushes the locking member 4 to move it backward in the sleeve 3 (that is, to a side being opposite to the opening part 21 side). This causes the protruded part 7 to come out from the escape groove 14 and to move to the front end part 11 of the notch hole 10 (that is, to the end part opposite to the opening part 21 side of the main body 2). As a result, the state when inverse and non-inverse rotation of the protruded part 7 restricted so far by the escape groove 14 is released.

Figure 7C:
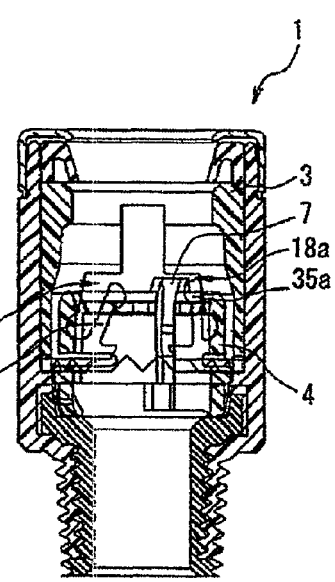
Figure 8:
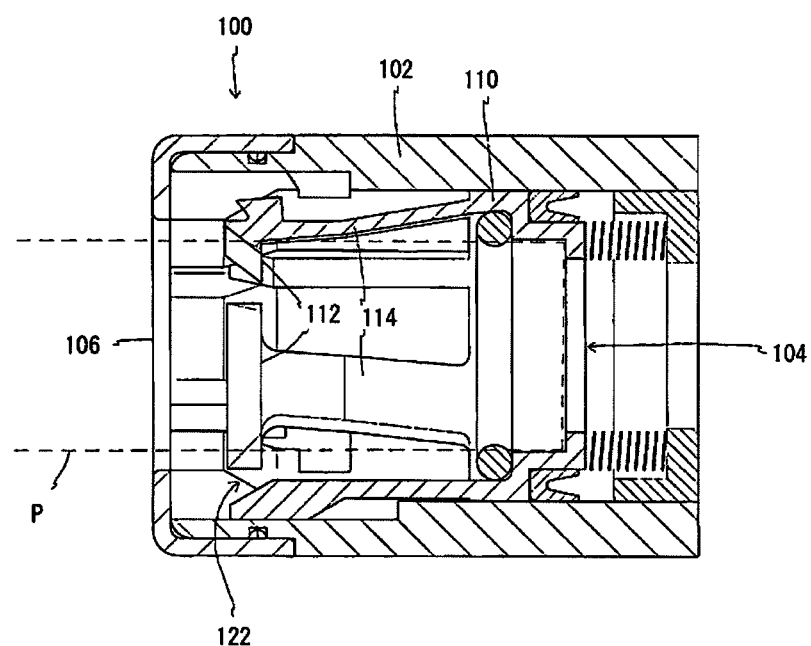
FIG. 8 is a diagram diagrammatically showing an example of a conventional tube fitting.

In this state, the operator slightly rotates the tube 50 in a circumferential direction (in any one of right and left directions) around an axial line of the tube 50 (that is, of the main body 2). The press nail 8 bites the tube 50 and, by its friction force in a circumferential direction, the locking member 4 is also rotated in the sleeve 3 fixed, together with the tube 50, to the main body 2 in a circumferential direction. As a result, the protruded part 7 enters the circumferentially directional groove 18a (or 18b). FIG. 7C shows a cross-sectional view obtained when FIG. 6E is seen at an angle different by 90 degrees. It is understood from FIG. 7C that, by the rotation of the locking member 4 (protruded part 7) in a circumferential direction, the momentum-giving member 36 (guiding part 35 (35a in FIG. 7C)) is bent and deformed in a circumferential direction.

In this state, when an operator pulls the tube 50 in a pulling and removing direction, the locking member 4 being in a locked state moves to the opening part 21 side together with the tube 50. At this time, a rear end (end on the opening part 21 side) of the protruded part 7 comes into contact with the sides 17a and 17b of the notch hole 10, which causes the tapered face 43 for lock releasing formed in the protruded part 7 to come into contact with the tapered face 33 formed in the sides 17a and 17b in a state of being struck and then to slide the tapered face 33 in a state of being contacted and, as described above, to extend the distance between facing extended parts 6 (the distance between the press nails 8). As a result, when the distance between the facing press nails 8 is extended so as to be larger than the diameter of the tube 50, the pressure contact of the tube 50 by the press nails 8 is released, thereby pulling and removing the tube 50 only (FIG. 6F)

Thus, according to the tube fitting 1 of the embodiment of the present invention, an operator, simply by pushing the tube 50 in an inserting direction and by slightly rotating the tube 50 in a circumferential direction and by pulling and removing the tube 50, can remove the tube 50 from the tube fitting 1. Moreover, these procedures can be performed with one hand.

Further, when an operator, after the completion of pulling and removing of the tube 50, stops the pulling and removing of the tube 50, the extended parts 6 whose diameter has been forcedly extended generates restoring force trying to return itself to its original state. The restoring force induces an action to cause the tapered face 33 for lock releasing to slide the tapered face 43 for lock releasing in a state of being contacted in a direction being reverse to the direction in which the tube 50 is pulled and removed. After the tube 50 is pulled and removed, the rotational force having acted on the locking member 4 is also released and, therefore, by the momentum-giving force of the momentum-giving member 36, the action to return the locking member 4 back to a specific position in a circumferential direction occurs. Moreover, by the momentum-giving member 9, the locking member 4 is moved to the opening part 21 side and is returned back to its original specific position as shown in FIG. 1.

As described above, according to the tube fitting of the present invention, it is possible to easily attach or detach the tube by one hand manipulation, thus improving an attachable and detachable property and to maintain the pressure contact force for holding the tube. Further, in the process of manufacturing the tube fitting, assembly operations to incorporate the locking member into the sleeve become very easy and automation production line is made possible, thus achieving the reduction of costs and improvement in practicability of the tube fitting.

It is apparent that the present invention is not limited to the above embodiment but may be changed and modified without departing from the scope and spirit of the invention.

What is claimed is:

1. A tube fitting comprising:
   a tubular main body;
   a sleeve being tubular-shaped and being positioned within said main body with axial lines of the main body and the sleeve being coincided with each other, said sleeve including a side groove circumferentially extending around a portion of an outer circumferential surface of the sleeve;
   a locking member having a ring part and a plurality of extended parts extended, from the ring part, in an axial direction, the locking member including a protruded part and said locking member being substantially nested within the sleeve in a state where axial lines of the ring part and the sleeve are coincided with each other and being movable in the sleeve in an axial direction with said protruded part moving into said side groove to selectively permit rotation of the entire locking member in a circumferential direction;
   wherein each of the extended parts has facing press nails protruding inward, and a distance between the facing press nails is made smaller than an outer diameter of the tube so as to press the tube inserted into a space therebetween by the facing press nails;
   wherein the locking member has a first tapered face and the sleeve has a first contact part corresponding to the first tapered face to decrease the diameter of the extended parts;
   wherein, when inserting the tube into the space, the tube is fixed and contacted with pressure by the facing press nails, when the tube is pulled and moved in a pulling and removing direction without being rotated, the locking member is pulled and moved in the pulling and removing direction with the first tapered face decreasing the diameter of the extended parts that comes into contact with the first contact part corresponding to the first tapered face in a state of being struck and slides the first contact part in a state of being contacted and the distance between the extended parts is lessened;
   wherein the locking member has a second tapered face and the sleeve has a second contact part corresponding to the second tapered face to release the locking member; and
   wherein, during removal of the tube inserted into the space wherein the tube is fixed and contacted with pressure by the facing press nails is rotated and the tube is pulled and moved in a pulling and removing direction in a circumferentially directional position in which the tube is rotated, the locking member is pulled and moved in the pulling and removing direction and the second tapered face to release the locking member comes into contact with the second contact part corresponding to the second tapered face and slides the second contact part to extend the distance between the extended parts, contact with pressure by the facing press nails is released.

2. The tube fitting according to claim 1, wherein the sleeve has a notch hole passing through a tubular wall part,
   the locking member has a protruded part extending outward from each of the extended parts, and
   the protruded part is movably engaged in the notch hole.

3. The tube fitting according to claim 2, wherein an escape groove into which the protruded part is allowed to enter in an axial direction is formed in a rear end part of the notch hole.

4. The tube fitting according to claim 3, wherein the sleeve has a guiding part, which guides the protruded part into the escape groove when the protruded part is moved in the pulling and removing direction of the tube.

5. The tube fitting according to claim 4, wherein the guiding part is formed by parts, which are respectively extended from a front end of the notch hole toward both corners of an entrance of the escape groove.

6. The tube fitting according to claim 4, further comprising a second momentum-giving member for positioning the locking member at a specific place in the circumferential direction,
   wherein the second momentum-giving member returns the locking member to the specific place when the locking member is rotated in the circumferential direction.

7. The tube fitting according to claim 6, wherein the guiding part serves as the second momentum-giving member.

8. The tube fitting according to claim 6, wherein, in a state where an axial directional external force and a circumferential directional external force do not act on the tube inserted in the space between the extended parts and pressed by the facing press nails, the axial directional position of the protruded parts is positioned in the escape groove by the first momentum-giving member, or the first and the second momentum-giving members.

9. The tube fitting according to claim 3, wherein a slit part, into which the protruded part is allowed to enter the notch hole, in an axial direction of the sleeve, from the outside of the sleeve, is formed at a front end of the notch hole.

10. The tube fitting according to claim 9, wherein the slit part is formed at a position facing the escape groove in an axial direction of the sleeve.

11. The tube fitting according to claim 1, further comprising a first momentum-giving member for momentum giving the locking member in the pulling and removing direction of the tube.

12. The tube fitting according to claim 11, wherein a pair of the first momentum-giving members are integrated with the locking member, the first momentum-giving members are symmetrically provided with respect to an axis of the ring part and corresponded to the positions of the extended parts, and wherein, inserting the tube, the locking member is pushed and moved in an inserting direction, end parts of the first momentum-giving members and the corresponding contact parts of the main body contact so as to bend the ring part and extend the distance between the extended parts.

13. The tube fitting according to claim 11, further comprising a second momentum-giving member for positioning the locking member at a specific place in the circumferential direction, wherein the second momentum-giving member returns the locking member to the specific place when the locking member is rotated in the circumferential direction.

14. A tube fitting comprising:

a tubular main body;

a sleeve being tubular-shaped and being positioned within the main body with axial lines of the main body and the sleeve being coincided with each other, said sleeve including a side groove circumferentially extending around a portion of an outer circumferential surface of the sleeve;

a locking member having a ring part and a plurality of extended parts extended, from the ring part, in an axial direction, the locking member including a protruded part and said locking member being substantially nested within the sleeve in a state where axial lines of the ring part and the sleeve are coincided with each other and being movable in the sleeve in an axial direction and with said protruded part moving into said side groove to selectively permit rotation of the entire locking member in a circumferential direction;

wherein each of the extended parts has facing press nails protruding inward, and a distance between the facing press nails is made smaller than an outer diameter of the tube so as to press the tube inserted into a space therebetween by the facing press nails;

wherein the sleeve has a first tapered face and the locking member has a first contact part corresponding to the first tapered face to decrease the diameter of the extended parts;

wherein, when inserting the tube into the space, the tube is fixed and contacted with pressure by the facing press nails, when the tube is pulled and moved in a pulling and removing direction without being rotated, the locking member is pulled and moved in the pulling and removing direction with the first tapered face decreasing the diameter of the extended parts that comes into contact with the first contact part corresponding to the first tapered face in a state of being struck and slides the first contact part in a state of being contacted and the distance between the extended parts is lessened;

wherein the sleeve has a second tapered face and the locking member has a second contact part corresponding to the second tapered face to release the locking member; and wherein, during removal of the tube inserted into the space wherein the tube is fixed and contacted with pressure by the facing press nails is rotated and the tube is pulled and moved in a pulling and removing direction in a circumferentially directional position in which the tube is rotated, the locking member is pulled and moved in the pulling and removing direction and the second contact part to release the locking member comes into contact with the second tapered face corresponding to the second contact part and slides the second contact part to extend the distance between the extended parts, contact with pressure by the facing press nails is released.

15. The tube fitting according to claim 14, wherein the sleeve has a notch hole passing through a tubular wall part, the locking member has a protruded part extending outward from each of the extended parts, and the protruded part is movably engaged in the notch hole.

16. The tube fitting according to claim 15, wherein an escape groove into which the protruded part is allowed to enter in an axial direction is formed in a rear end part of the notch hole.

17. A tube fitting comprising:

a tubular main body;

a sleeve being tubular-shaped and being positioned within the main body with axial lines of the main body and the sleeve being coincided with each other, said sleeve including a side groove circumferentially extending around a portion of an outer circumferential surface of the sleeve;

a locking member having a ring part and a plurality of extended parts extended, from the ring part, in an axial direction, the locking member including a protruded part and said locking member being substantially nested within the sleeve in a state where axial lines of the ring part and the sleeve are coincided with each other and being movable in the sleeve in an axial direction with said protruded part moving into said side groove to selectively permit rotation of the entire locking member in a circumferential direction;

wherein each of the extended parts has facing press nails protruding inward, and a distance between the facing press nails is made smaller than an outer diameter of the tube so as to press the tube inserted into a space therebetween by the facing press nails;

wherein the locking member has a first tapered face and the sleeve has a first contact part corresponding to the first tapered face to decrease the diameter of the extended parts;

wherein, when inserting the tube into the space, the tube is fixed and contacted with pressure by the facing press nails, when the tube is pulled and moved in a pulling and removing direction without being rotated, the locking member is pulled and moved in the pulling and removing direction with the first tapered face decreasing the diameter of the extended parts that comes into contact with the first contact part corresponding to the first tapered face in a state of being struck and slides the first contact part in a state of being contacted and the distance between the extended parts is lessened;

wherein the sleeve has a second tapered face and the locking member has a second contact part corresponding to the second tapered face to release the locking member; and wherein, during removal of the tube inserted into the space wherein the tube is fixed and contacted with pressure by the facing press nails is rotated and the tube is pulled and moved in a pulling and removing direction in a circumferentially directional position in which the tube is rotated, the locking member is pulled and moved in the pulling and removing direction and the second tapered face to release the locking member comes into contact with the second contact part corresponding to the second tapered face and slides the second contact part to extend the distance between the extended parts, contact with pressure by the facing press nails is released.

18. The tube fitting according to claim 17, wherein the sleeve has a notch hole passing through a tubular wall part, the locking member has a protruded part extending outward from each of the extended parts, and the protruded part is movably engaged in the notch hole.

19. The tube fitting according to claim 18, wherein an escape groove into which the protruded part is allowed to enter in an axial direction is formed in a rear end part of the notch hole.

20. A tube fitting comprising:

a tubular main body;

a sleeve being tubular-shaped and being positioned within the main body with axial lines of the main body and the sleeve being coincided with each other, said sleeve including a side groove circumferentially extending around a portion of an outer circumferential surface of the sleeve;

a locking member having a ring part and a plurality of extended parts extended, from the ring part, in an axial direction, the locking member including a protruded part and said locking member being substantially nested within the sleeve in a state where axial lines of the ring part and the sleeve are coincided with each other and being movable in the sleeve in an axial direction with said protruded part moving into said side groove to selectively permit rotation of the entire locking member in a circumferential direction;

wherein each of the extended parts has facing press nails protruding inward, and a distance between the facing press nails is made smaller than an outer diameter of the tube so as to press the tube inserted into a space therebetween by the facing press nails;

wherein the sleeve has a first tapered face and the locking member has a first contact part corresponding to the first tapered face to decrease the diameter of the extended parts;

wherein, when inserting the tube into the space, the tube is fixed and contacted with pressure by the facing press nails, when the tube is pulled and moved in a pulling and removing direction without being rotated, the locking member is pulled and moved in the pulling and removing direction with the first tapered face decreasing the diameter of the extended parts that comes into contact with the first contact part corresponding to the first tapered face in a state of being struck and slides the first contact part in a state of being contacted and the distance between the extended parts is lessened;

wherein the locking member has a second tapered face and the sleeve has a second contact part corresponding to the second tapered face to release the locking member; and wherein, during removal of the tube inserted into the space wherein the tube is fixed and contacted with pressure by the facing press nails is rotated and the tube is pulled and moved in a pulling and removing direction in a circumferentially directional position in which the tube is rotated, the locking member is pulled and moved in the pulling and removing direction and the second contact part to release the locking member comes into contact with the second tapered face corresponding to the second contact part and slides the second contact part to extend the distance between the extended parts, contact with pressure by the facing press nails is released.

* * * * *